US009116691B2

(12) United States Patent
Kamp

(10) Patent No.: US 9,116,691 B2
(45) Date of Patent: Aug. 25, 2015

(54) POWER SUPPLY MANAGEMENT CONTROLLER INTEGRATED CIRCUIT, POWER MANAGEMENT CIRCUIT FOR ELECTRICALLY POWERED SYSTEMS, AND METHOD OF MANAGING POWER TO SUCH SYSTEMS

(75) Inventor: Petrus Johannes Maria Kamp, Rosmalen (NL)

(73) Assignee: Anagear B.V. (NL)

( * ) Notice: Subject to any disclaimer, the term of this patent is extended or adjusted under 35 U.S.C. 154(b) by 1083 days.

(21) Appl. No.: 13/128,455

(22) PCT Filed: Nov. 12, 2009

(86) PCT No.: PCT/NL2009/050682
§ 371 (c)(1),
(2), (4) Date: Jul. 12, 2011

(87) PCT Pub. No.: WO2010/056118
PCT Pub. Date: May 20, 2010

(65) Prior Publication Data
US 2011/0264936 A1 Oct. 27, 2011

Related U.S. Application Data

(60) Provisional application No. 61/113,916, filed on Nov. 12, 2008.

(51) Int. Cl.
*G06F 1/08* (2006.01)
*G06F 1/00* (2006.01)
*G06F 1/32* (2006.01)
(52) U.S. Cl.
CPC ............... *G06F 1/3203* (2013.01); *G06F 1/08* (2013.01); *G06F 1/3287* (2013.01); *Y02B 60/1282* (2013.01)

(58) Field of Classification Search
CPC .................................................. G06F 1/3287
See application file for complete search history.

(56) References Cited

U.S. PATENT DOCUMENTS

| 4,698,748 A | 10/1987 | Juzswik et al. |
| 5,167,024 A | 11/1992 | Smith et al. |
| 5,990,868 A | 11/1999 | Frederick |
| 2004/0148533 A1 | 7/2004 | Nicholas |
| 2005/0168438 A1 | 8/2005 | Casebolt et al. |
| 2006/0071728 A1* | 4/2006 | Chen .............................. 331/158 |
| 2007/0124615 A1* | 5/2007 | Orr ................................ 713/300 |
| 2007/0262826 A1* | 11/2007 | Dowlatabadi .................. 331/185 |

OTHER PUBLICATIONS

International Search Report for corresponding PCT Application No. PCT/NL2009/050682.

* cited by examiner

*Primary Examiner* — Paul Yanchus, III
*Assistant Examiner* — Joshua Neveln
(74) *Attorney, Agent, or Firm* — Wood, Phillips, Katz, Clark & Mortimer

(57) ABSTRACT

A power supply management controller integrated circuit for managing power supply to system units of a system, comprising power supply means for powering the system units, a power supply control unit for controlling the powering, a wake-up timer unit, and means for acknowledging an active or passive state of the system, wherein the power supply control unit is arranged for cooperating with the means for acknowledging the state of the system for enabling the power supply control unit to cease powering of the system units for de-activation of the system during the passive state of the system, and for enabling the power supply control unit to maintain powering during an active state of the system, and wherein the power supply control unit is arranged for cooperating with the wake-up timer unit for periodically powering the system units during the passive state of the system for enabling activation of the system.

13 Claims, 1 Drawing Sheet

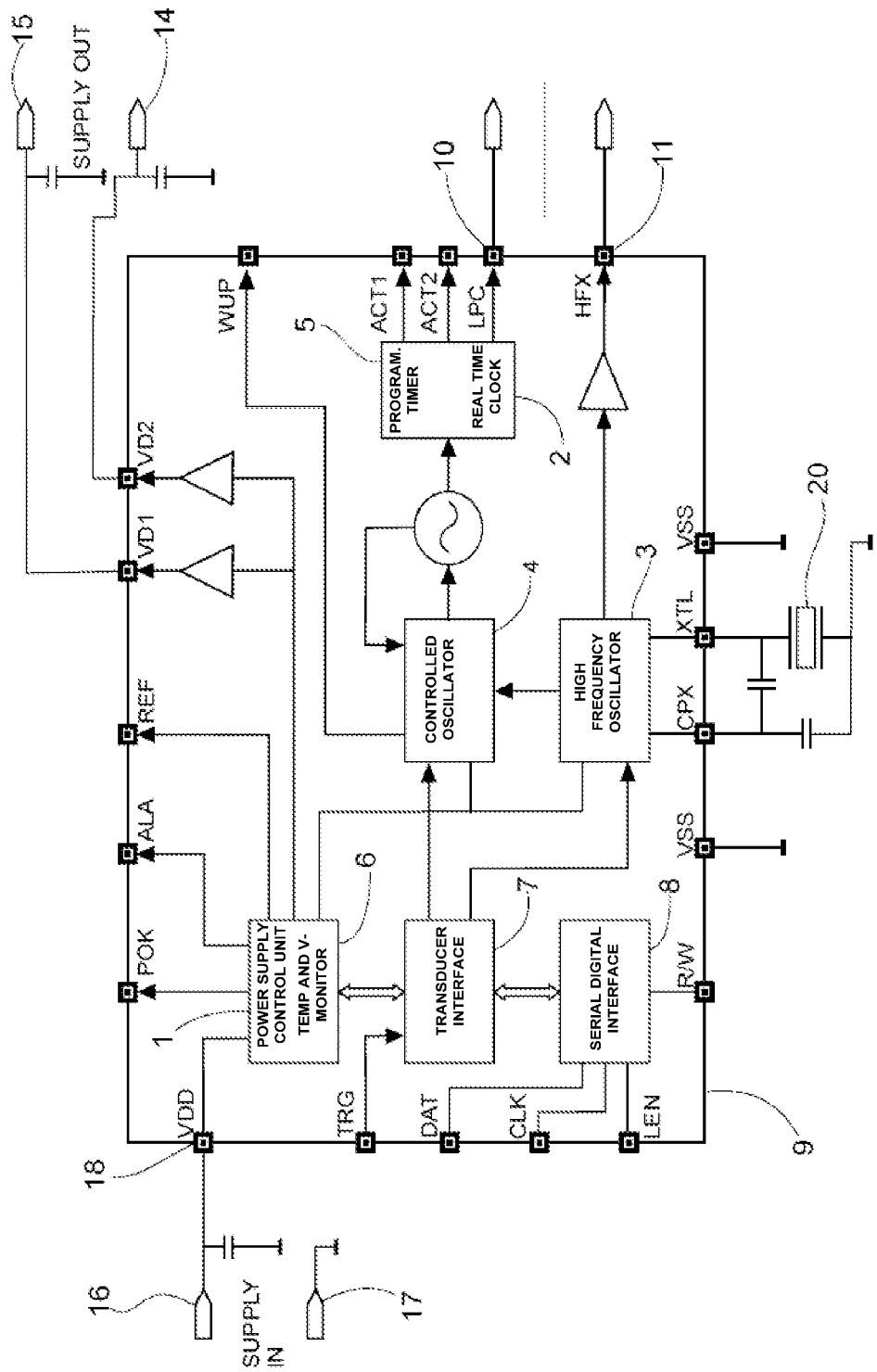

POWER SUPPLY MANAGEMENT CONTROLLER INTEGRATED CIRCUIT, POWER MANAGEMENT CIRCUIT FOR ELECTRICALLY POWERED SYSTEMS, AND METHOD OF MANAGING POWER TO SUCH SYSTEMS

FIELD OF THE INVENTION

The present invention is directed to a power supply management controller integrated circuit for managing power supply to one or more system units of a system, a power management circuit for electrically powered systems using such an integrated circuit, and to a method of managing power supply to such a system.

BACKGROUND OF THE INVENTION

With the continuing shrink of silicon device sizes, the processing speed of digital signal processors and micro controllers keeps on growing. However the current consumption is rising too. In many electronic systems high processing speed is only needed during short periods of operation. The rest of the time such systems are in a sleep mode or standby mode at a very low activity level. However the systems cannot be fully shut off as they must be able to resume full operation in a very short period of time. In particular as a result of high leakage currents typical for silicon devices there is still significant supply current being drawn by the systems in sleep mode or standby mode. It will be appreciated that this is not desired from the point of view of energy conservation. Moreover, due to this inefficient use of available energy, many of these type of applications must be powered by mains voltage or a by a durable, large capacity power source that enables operation over a sufficiently long period of time. Battery operation is often not possible, or results in the application being large and bulky, and as therefore difficult to handle or install.

SUMMARY OF THE INVENTION

The present invention is directed to resolving the above mentioned problem, and providing a power management controller which is small, fast, reliable and accurate.

To this end, the present invention provides a power supply management controller integrated circuit for managing power supply to one or more system units of a system, said integrated circuit comprising power supply means for powering said system units, a power supply control unit for controlling said powering of said system units, a wake-up timer unit, and means for acknowledging an active or passive state of said system, wherein said power supply control unit is arranged for cooperating with said means for acknowledging said state of said system for enabling said power supply control unit to cease powering of said system units for de-activation of said system during said passive state of said system, and for enabling said power supply control unit to maintain powering of said system units during an active state of said system, and wherein said power supply control unit is arranged for cooperating with said wake-up timer unit for periodically powering said system units during said passive state of said system for enabling activation of said system.

The integrated circuit of the present invention enables complete shut down of the one or more system units in the system, or the complete system as a whole (dependent on the application).

The integrated circuit takes over all critical system functions when the system is in the de-activated state, and is able to wake-up the full system in a fast and time accurate way. This allows the use of fast signal processors in battery operated equipment or in equipment operated from an unreliable energy source.

In particular, since the integrated circuit of the present invention periodically powers the system units during the de-activated state of the system, power supply management controller integrated circuit of the present invention makes it possible for the system to wake-up as soon as activation of the system is required for processing data or other functions.

The means for acknowledging an active or passive state of the system may be integrated in the power supply control unit of the integrated circuit. In particular, the power supply control unit may be able to detect the active or passive state of the system based on voltage difference, amount of current being drawn, or the temperature of the system units being monitored. Moreover, the means for acknowledging an active or passive state of said system may be connected to a sensor signal input for receiving sensor signals from a sensor unit. Such a sensor unit may for example be at least one element of a group comprising an internal sensor unit of said integrated circuit, a micro-electro-mechanical systems (MEMS) based sensor such as a pressure sensor implemented on said integrated circuit, an external sensor unit, a voltage level sensor, a current sensor or a temperature sensor. It should be appreciated, however, that other types of sensor units may be used as well, e.g. dependent on the application.

The terms 'active', 'passive', 'de-activated' and 'activated' are to be interpreted as follows. The active or passive state of the system refers to the presence or absence of a requirement for the system to perform its functions, i.e. data processing, interaction between system units or performing specific tasks of the system. A passive state thus refers to a state wherein the system is activated, but without performing any required activity (e.g. a wait-state or idle state). De-activation or activation refers to the power supply management controller integrated circuit switching off power to the system units under control, and taking over the system critical functions (e.g. providing a clock signal). In this respect, activation and wake-up both refer to the system being powered on by the integrated circuit of the invention, after a period of de-activation. De-activation turns the system to a de-activated or standby mode by cutting off power to the system units under control, and taking over critical system functions by the integrated circuit.

According to another embodiment of the invention, said integrated circuit further comprises a clock unit for providing a clock signal for said wake-up timer unit. A clock unit enables accurate operation of the wake-up timer, and makes the integrated circuit self-supporting in that it does not have to rely on an external clock circuit. Moreover, the accurate clock unit of this embodiment provides a clock signal that can be used by external units, such as system units that rely on an accurate clock signal even during a de-activated state of the system.

The clock unit may be operatively connected to an oscillator unit. Such an oscillator unit may comprise any of a group comprising a crystal oscillator or a controlled oscillator. In case a controlled oscillator is present in the clock unit, this oscillator comprises tuning means arranged for periodically tuning said controlled oscillator according to a duty cycle, and wherein said tuning means are arranged for adapting said duty cycle dependent on a tuning signal which is indicative of an environmental parameter. Accurate tuning of the oscillator may be achieved by means of a suitable combination of a phase locked loop, a delay locked loop, and/or a frequency locked loop in a manner known to the skilled person.

A special feature of this embodiment is that tuning is performed periodically according to a variable duty cycle. The tuning cycle is made dependent on parameters that may influence the oscillation frequency. Such parameters include, amongst others, the temperature of the oscillator or the rate of change of this temperature. The present embodiment is designed to perform tuning more intensively (by amending the duty cycle within which tuning is performed) or less intensively dependent on the need for tuning.

As mentioned, the clock unit may comprise a crystal oscillator. In particular, this may be a low power high frequency oscillator with the following characteristics: very low current consumption, fast start-up time, programmable power modes. The high frequency oscillator may provide a clean reference clock to system units, such as radio devices and/or high speed data converters in a system.

The start-up time of a crystal oscillator is generally interpreted as the duration of time required for the oscillator circuit to generate a stable and desired oscillation signal from the time of power-on. In a preferred embodiment, the fast start-up time and programmable power modes are based on precision control of the amplitude of oscillation. In this embodiment, a low-power mode of the crystal oscillator is achieved by reducing the oscillation amplitude to a low level, while in high-power mode the amplitude is increased for providing a strong clock reference signal. Transition from the low-power mode to the high-power mode can be performed relatively fast. This principle is used for providing the short start-up time and fast start-up. In this embodiment, start-up is thus performed by switching the oscillator from a low-power to a high-power mode, instead of switching the oscillator from no power to power-on. Moreover, since the low-power and high-power levels are programmable (the amplitude is programmable), the start-up time can be influenced by selecting/optimizing suitable power levels.

According to another embodiment of the invention, integrated circuit may comprise a transducer interface for enabling said integrated circuit to be operatively connected to an (external) transducer. This enables connection of transducers to monitor specific system parameters which cannot be monitored with the on-chip provided transducers (e.g. gas or pressure). Such parameters may be indicative for a need to 'wake-up' the system from a de-activated state as facilitated by the power supply management controller integrated circuit of the present invention. In relation to this, it is noted that apart from periodic powering of the one or more system units during said de-activated state of said system for enabling activation of said system, the power supply control unit may be arranged to wake-up the system on detection of a voltage level or temperature within the system which exceeds or drops below a certain preprogrammed threshold. In that case, in order to control such a parameter, the system may require to take action immediately (e.g. by regulating a voltage, switching on a ventilation unit or other cooling means, or the like).

According to another embodiment, said integrated circuit comprises a communication interface for reading or writing data to said integrated circuit. The integrated circuit may be arranged for programming of operation parameters of said circuit, using the communication interface. The communication interface may comprise a serial or parallel digital input or output, for writing or reading said data. Communication may of course also take place in a different suitable way.

The term power supply means, as used herein, should be interpreted to include a power supply input, such as an input voltage connector, which enables the integrated circuit to be connected to an external power source, such as a battery, mains voltage adapter or transformer unit, an alternative suitable AC or DC power source, or an energy harvesting device (i.e. for deriving energy from external sources, such as solar power, thermal energy, wind energy, salinity gradients, and kinetic energy). Integrated circuit according to any of the previous claims, wherein said power supply means comprise an input voltage connector for receiving power from an external power source.

According to a second aspect of the invention, there is provided a power supply management circuit comprising an integrated circuit as described above.

According to a third aspect of the invention, there is provided a method of managing power supply to one or more system units of a system, wherein said system units are powered by power supply means, and wherein said powering of said units is controlled by a power supply control unit, said method comprising a step of: acknowledging an active or passive state of said system; said power supply control unit managing said supply by ceasing powering of said system units for de-activation of said system during said passive state of said system, and maintaining powering of said system units during an active state of said system, and said power supply control unit periodically powering said system units during said passive state of said system for enabling activation of said system.

BRIEF DESCRIPTION OF THE DRAWINGS

The present invention will be further elucidated through description of an embodiment thereof, with reference to the enclosed drawing, wherein:

FIG. 1 is a schematic layout of an integrated circuit according to an embodiment of the present invention.

DETAILED DESCRIPTION OF THE DRAWING

The invention is directed to a largely analog integrated device (also referred to as power supply management controller integrated circuit) that enables complete shut down of other devices in a system (e.g. devices characterized by high leakage current). The integrated circuit takes over all critical system functions in standby or de-activated mode and is able to wake-up the full system in a fast and time accurate way. This will allow the use of fast signal processors in battery operated equipment or in equipment operated from an unreliable energy source.

The key function of the Integrated circuit is to be the system reference for supply (voltage) and time (clock signals) as well as being a monitor of the system's operating conditions. The integrated circuit has ultra low current consumption and therefore never has to be switched off in practice. The integrated circuit has one or more of the functions listed below. How the functions interact is shown in the block diagram.

FIG. 1 illustrates the layout of an integrated circuit 9 in accordance with an embodiment of the present invention. In FIG. 1, the integrated circuit 9 comprises a power supply voltage regulator or power supply control unit 1, a real time clock 2, a high frequency oscillator 3, a controlled oscillator 4, programmable timers 5 (in this embodiment integrated with real time clock 2), temperature and/or voltage monitors 6 (in this embodiment integrated with the power supply control unit 1), a transducer interface 7, and serial digital interface 8.

Power supply control unit 1, comprising one or more voltage regulators, creates the supply voltage for other system parts. This supply voltage is provided through outputs VD1 and VD2 of the integrated circuit, being connected to output terminals 14 and 15 in FIG. 1. The regulators in the control unit 1 can be shut-off and their output can be disabled to fully shut down connected system parts. A power-on reset circuit is part of the power management system and produces a logic signal (pok) when the supply voltage has reached a predefined and stable level. Although any suitable power source may be applied, in the present embodiment, the integrated circuit 9 receives its power via supply voltage inputs 16 and 17, through input 18 (VDD) of the integrated circuit 9.

The real time clock 2 can either be based on a crystal oscillator 3 or a Controlled Oscillator (CO) 4, or both. High frequency oscillator 3 comprises a crystal based oscillator with the following special characteristics: very low current consumption, fast start-up, programmable power modes. The high frequency oscillator provides a clean reference clock to, for example radio devices (not shown) and/or high speed data converters (not shown) in the system. This (reference) clock signal is provided to the system units via outputs 10 and 11 (CLOCK out) of the integrated circuit.

The fast start-up time and programmable power modes are based on precision control of the amplitude of oscillation. A low-power mode of the crystal oscillator is achieved by reducing the oscillation amplitude to a low level, while in high-power mode the amplitude is increased for providing a strong clock reference signal. Transition from the low-power mode to the high-power mode can be performed relatively fast. This principle is used for providing the short start-up time and fast start-up. In this embodiment, start-up is thus performed by switching the oscillator 3 from a low-power to a high-power mode.

Controlled oscillator 4 is a low frequency oscillator which is periodically tuned by a low power but high frequency crystal oscillator 3. Under duty cycle control. The tuning is performed using a combination of a Phase Locked Loop (PLL), a Frequency Locked Loop (FLL) and a Delay Locked Loop (DLL). The tuning is performed according to a duty cycle. The controlled oscillator uses adaptive duty cycle control for the timing of the tuning of the oscillator. The duty cycle depends on the rate of change of environmental factors, such as temperature.

Programmable timers 5 are used to wake-up system parts at a pre-programmed time. The timers are controlled based on the clock signal provided by the clock unit 2. A wake-up timer unit causes providing a trigger signal to the power supply control unit at the end of a count-down cycle for temporarily powering the system units, such as to enable the system to be activated if required. If the system is required to activate from a de-activated state, this may either be detected within the power supply control unit 1, or alternatively the system may provide an indication signal to the integrated circuit.

One of the timers 5 is a watchdog counter which resets the system if it has detected that the system has unintentionally entered a locked-up mode. The watchdog counter is a digitally implemented pulse counter which is preset and counts down to zero. When the zero count is reached a logic signal is generated which can be used to reset or restart (part of) the system. The counter is periodically preset by the system to prevent that the zero count will be reached during normal operation. If zero count is reached then this means that normal system operation is not possible anymore (e.g. due to a software bug or other system failure) an a reset is necessary.

The temperature and voltage monitors 6 are monitor circuits that create trigger signals (e.g. wake up signals) to other parts of the system in case certain pre-programmed thresholds have been exceeded.

The transducer interface 7 allows the connection of transducers to the integrated circuit for monitoring specific system parameters which cannot be monitored with the on-chip provided transducers (e.g. gas or pressure).

Serial digital interface enables communication with the integrated circuit during normal system operation. It can be used to write settings to or read parameters form the device. It can also be used to provide programming data to the integrated circuit for programming its operational parameters.

What is claimed is:

1. Power supply management controller integrated circuit for managing power supply to one or more system units of a system, said integrated circuit comprising power supply means for powering said system units, a power supply control unit for controlling said powering of said system units, a wake-up timer unit, a clock unit for providing a clock signal for said wake-up timer unit and means for acknowledging an active or passive state of said system,
   wherein said power supply control unit is arranged for cooperating with said means for acknowledging said state of said system for enabling said power supply control unit to cease powering of said system units for de-activation of said system during said passive state of said system, and for enabling said power supply control unit to maintain powering of said system units during an active state of said system,
   wherein said power supply control unit is arranged for cooperating with said wake-up timer unit for periodically powering said system units during said passive state of said system for enabling activation of said system, and
   wherein said clock unit is operatively connected to a controlled oscillator, and wherein said oscillator comprises tuning means arranged for periodically tuning said controlled oscillator according to a duty cycle, and wherein said tuning means are also arranged for adapting said tuning duty cycle dependent on a tuning signal which is indicative of an environmental parameter, such that said tuning is performed periodically according to a variable tuning duty cycle, wherein the tuning duty cycle is made dependent on environmental parameters.

2. The power supply management controller integrated circuit according to claim 1, wherein said means for acknowledging said state of said system are comprised by or integrated within said power supply control unit.

3. The power supply management controller integrated circuit according to claim 2, wherein for acknowledging said state of said system, said power supply control unit is arranged for detecting current or current variations of a supply current provided to said system units.

4. The power supply management controller integrated circuit according to claim 1, wherein said means for acknowledging an active or passive state of said system are connected to a sensor signal input for receiving sensor signals from a sensor unit.

5. The power supply management controller integrated circuit according to claim 4, wherein said sensor unit comprises at least one element of a group comprising an internal sensor unit of said integrated circuit, a micro-electro-mechanical systems (MEMS) based sensor such as a pressure sensor implemented on said integrated circuit, an external sensor unit, a voltage level sensor, a current sensor or a temperature sensor.

6. The power supply management controller integrated circuit according to claim 1, said tuning means further comprising means for providing said tuning signal being indicative for at least one of a group comprising temperature, rate of change of temperature.

7. The power supply management controller integrated circuit according to claim 1, further comprising a transducer interface for enabling said integrated circuit to be operatively connected to a transducer.

8. The power supply management controller integrated circuit according to claim 1, further comprising a communication interface for reading or writing data to said integrated circuit.

9. The power supply management controller integrated circuit according to claim 8, said integrated circuit being configured for receiving programming data for programming of operational parameters of said circuit.

10. The power supply management controller integrated circuit according to claim 1, wherein said power supply means comprise an input voltage connector for receiving power from an external power source.

11. The power supply management controller integrated circuit according to claim 1, and an associated electrically powered system, said power supply management controller integrated circuit functioning as a power management circuit for said electrically powered system.

12. Method of managing power supply to one or more system units of a system, wherein said system units are powered by power supply means, and wherein said powering of said units is controlled by a power supply control unit, said method comprising a step of:
   acknowledging an active or passive state of said system;
   said power supply control unit periodically powering said system units during said passive state of said system for enabling activation of said system;
   providing a clock signal for said periodically powered said system units, and
   periodically tuning a frequency of said clock signal with a reference oscillator signal according to a variable duty cycle,
   wherein the periodically tuning comprises adapting said duty cycle dependent on a tuning signal which is indicative of an environmental parameter, such that said tuning is performed periodically according to a variable tuning duty cycle, wherein the tuning duty cycle is made dependent on environmental parameters.

13. Method according to claim 12, wherein the periodically tuning adapting said duty cycle dependent on a tuning signal which is indicative for at least one of a group comprising temperature, rate of change of temperature.

* * * * *